(12) United States Patent
Rabenold et al.

(10) Patent No.: US 8,739,059 B2
(45) Date of Patent: May 27, 2014

(54) SYSTEM FOR GENERATING INSPECTION REPORTS FOR INSPECTED ITEMS

(75) Inventors: Nancy J. Rabenold, Brandon, FL (US);
James A. Simmons, Brandon, FL (US);
Peter C. Ogden, Richfield, MN (US);
Howard B. Jones, Lakeland, FL (US);
Lewis A. Glow, Temple Terrance, FL (US)

(73) Assignee: Xcira, Inc., Tampa, FL (US)

( * ) Notice: Subject to any disclaimer, the term of this patent is extended or adjusted under 35 U.S.C. 154(b) by 0 days.

(21) Appl. No.: 10/908,535

(22) Filed: May 16, 2005

(65) Prior Publication Data

US 2006/0259392 A1   Nov. 16, 2006

(51) Int. Cl.
*G06F 3/048* (2013.01)

(52) U.S. Cl.
USPC ........... 715/780; 715/764; 715/221; 715/224; 715/226

(58) Field of Classification Search
USPC ........... 715/764, 224, 780, 221; 705/51, 2, 11
See application file for complete search history.

(56) References Cited

U.S. PATENT DOCUMENTS

| | | | | |
|---|---|---|---|---|
| 5,819,271 | A * | 10/1998 | Mahoney et al. | 1/1 |
| 6,032,184 | A * | 2/2000 | Cogger et al. | 709/223 |
| 7,031,979 | B2 * | 4/2006 | Kauffman | 707/104.1 |
| 7,353,223 | B2 * | 4/2008 | Klein | 707/610 |
| 7,565,306 | B2 * | 7/2009 | Apostolides | 705/8 |
| 7,613,627 | B2 * | 11/2009 | Doyle et al. | 705/7.15 |
| 2002/0169615 | A1 * | 11/2002 | Kruger et al. | 704/270.1 |
| 2003/0130989 | A1 * | 7/2003 | Kaufman | 707/3 |
| 2004/0128613 | A1 * | 7/2004 | Sinisi | 715/500 |
| 2006/0143126 | A1 * | 6/2006 | Vasishth et al. | 705/51 |

* cited by examiner

Primary Examiner — William L. Bashore
Assistant Examiner — Sherrod Keaton
(74) Attorney, Agent, or Firm — Smith Risley Tempel Santos LLC; Gregory Scott Smith

(57) ABSTRACT

An electronic inspection report system includes a central report generator and a data collection device. The central report generator is adapted to produce multiple types of inspection report template. The central report generator is adapted to select a type of inspection report template to provide to a data collection device based upon various criteria. The central report generator is adapted to receive electronic information from various databases and format the information such that the information can be used in inspection reports.
While inspecting an item, an inspector uses a data collection device to access an inspection report template and fill in fields of the inspection report template. The data collection device can be configured to check the consistency of information carried in fields of the inspection report and signal the inspector when some of the information is inconsistent.
The central report generator can include a repository of completed inspection reports. The central report generator can be configured to mine the repository of completed inspection reports and determine correlations between fields of the completed inspection reports. Software in the data collection device can updated such that the data collection device can perform consistency checks between fields that the central report generator has determined have a correlation.

9 Claims, 6 Drawing Sheets

SYSTEM FOR GENERATING INSPECTION REPORTS FOR INSPECTED ITEMS

BACKGROUND OF THE INVENTION

The present invention relates generally to inspection and reporting processes, and, more specifically, to a system that guides inspectors through the collection of asset-specific inspection data in the electronic format necessary to support and expand ecommerce.

Auctioning and selling of items over the Internet has rapidly expanded the market for used merchandise, and the number and types of consumers making purchase decisions based on electronic catalogs is increasing in tandem. A sellers' ability to provide up-to-date and accurate information on items being offered for auction or sale or type of commercial transaction has become extremely critical to achieving maximum value and decisive buyer satisfaction.

Historically, the asset inspection process and subsequent reporting processes involved in the asset disposition industry have been inconsistent, slow, manually intensive, and prone to human errors. For instance, a typical inspector would examine an asset and then record his or her findings, at best, on a paper-based form. Data entry personnel then subsequently process this information to assemble an electronic collection of data on the complete inventory. In many industries, such as the automotive industry, it is also necessary to link this data collection process to multiple industry-standard sale channels. This often results in redundant data entry efforts because each sale channel may have a unique data format requirement. Thus, there is a need in the art for a system that can quickly capture business-critical data, such as asset inspection information, and other data associated with the asset, and store the data into an electronic format where the data can rapidly and automatically be converted to interface with many different systems.

Traditionally, data collection devices used in the manual inspection process are limited to paper, pen/pencil and photographic devices, such as a camera. Raw data collected by inspectors must undergo a labor-intensive conversion process into an electronic format that can support eCommerce. The inspector forwards hand-written inspection results to data entry personnel for processing, where it can take on the order of hours, or even days to process an individual hand-written inspection form, depending upon the industry, number of inspections forms created, and penmanship. Data entry personnel may communicate back and forth with inspectors to decipher the information, and when the inspector is not available, the information is "interpreted" to the best of their ability. Images captured by a film-based photographic device are processed, individually scanned or transferred into a computer, renamed, integrated with inspection information and saved to a data repository on the Inspection Facility Host System. The typical embodiment of the data repository is a database application that resides virtually on a centralized, distributed, or other computer device on a secure network with controlled access to the Internet.

Thus, a heretofore-unaddressed need exists in the industry to address the aforementioned deficiencies and inadequacies.

BRIEF SUMMARY OF THE INVENTION

Embodiments of the present invention provide a system for inspecting items and generating an electronic inspection report. One aspect of the present invention is that the system has a repository of completed inspection reports and that the system mines the repository to determine correlations between fields of information in the completed inspection reports. Based upon the resulting field correlations the system checks condition data as the inspector is recording it to determine and/or prevent erroneous data inputs.

Another aspect of the invention is that the system is scalable to inspect items from various different industries. Typically, the items from different industries are very different such that a report template for an item from one industry is not appropriate for an item from another industry. The system is adapted to select the appropriate type of report template and provide the appropriate report template to a data collection device of an inspector. The system uses various criteria for determining the type of inspection report template to provide to the data collection device.

Other systems, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE SEVERAL VIEWS OF THE DRAWING

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
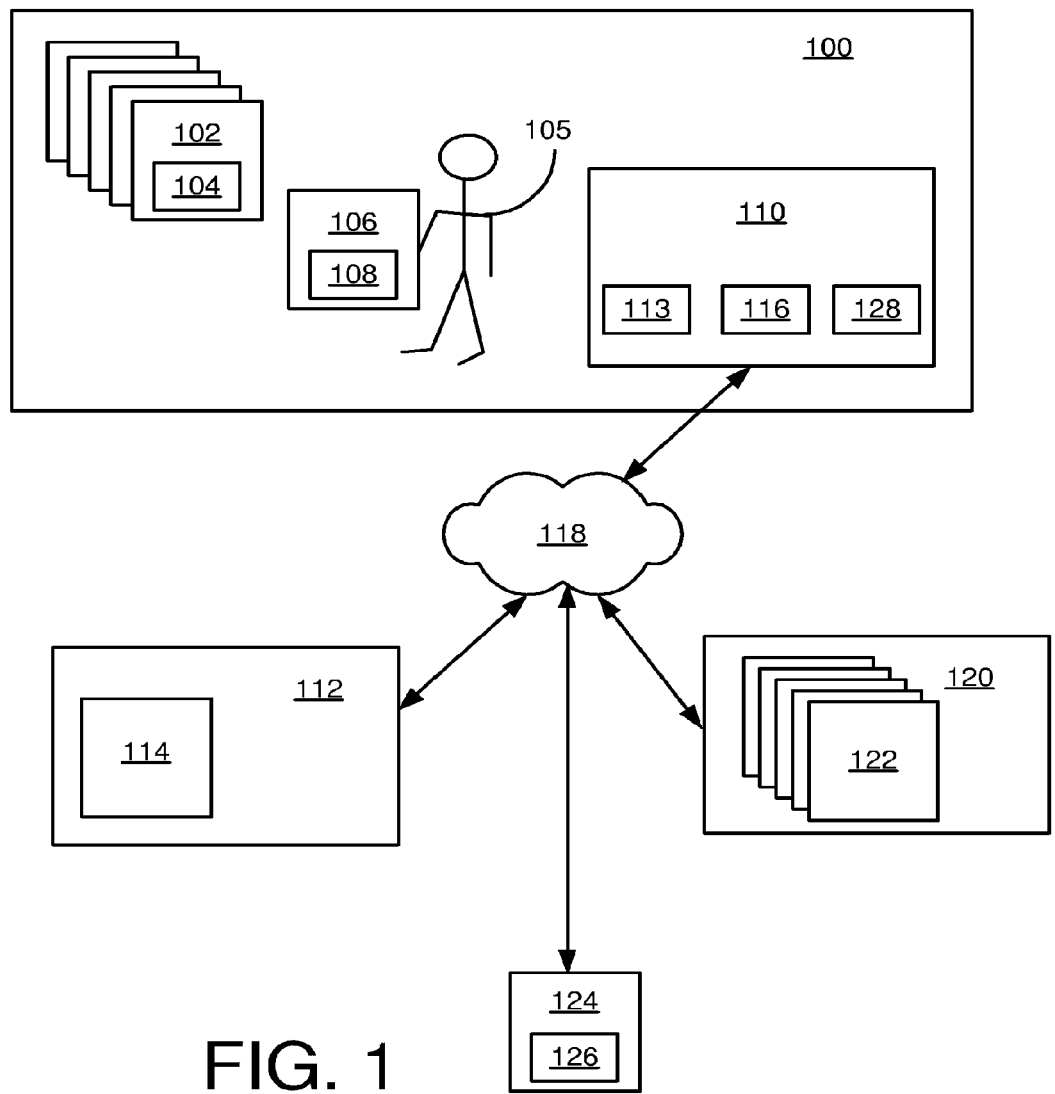
FIG. 1 is a block diagram of an inspection facility, which is in communication with other facilities and/or entities.

Referring to FIG. 1, an inspection facility 100 receives items 102 for inspection. The items 102 each have a unique identifier 104. A non-limiting example of an item 102 is a motorized vehicle, which has a vehicle identification number (VIN) as its unique identifier 104. Other general and non-limiting examples include any items, new or used, that are made available for purchase either at a particular site or through the use of an on-line viewing, purchase or auction system.

The items 102 are inspected by inspectors 105 who use a data collection device 106 to access a renderable report template 108. Non-limiting embodiments of a data collection device include a Personal Digital Assistant, an electronic tablet, and a computer system. Among other things, the data collection device 106 includes components such as a processor (not shown), memory (not shown), a user interface (not shown). The data collection device executes software that, among other things, controls user authentication, access to business-critical information at the data collection device, collection of asset condition information, capture of images, and data exchange with a data repository 128. The data collection device receives and stores all information required to use the data collection device and can be used either in an online or in off-line mode. Furthermore, in some embodiments, the data collection device 106 can be used online or off-line mode at a location that is remote from the inspection facility 100.

The data collection device 106 renders the renderable report template 108 into an electronic or audible form that has a plurality of fields, and the rendered report template is made electronically or audibly accessible to an inspector 105. The inspector provides the details of the item's condition while inspecting an item.

In some, or off-line, embodiments, after an inspector has completed his or her inspection of an item 102, the data collection device 106 communicates with a central report generator 110 and provides the central report generator with an inspector's report, which is referred to as a preliminary report 113. In other, or online, embodiments, the data collection device 106 communicates with the central report generator 110 during the inspection of an item 102, and the preliminary report 113 is updated on the central report generator 110 as the inspector provides the condition details. The preliminary report 113 includes information that the inspector has inputted into fields of the electronic form. Typically, the inspector selects options and/or populates fields using tabs and/or pull-down menus and/or by manually and/or verbally entering input.

Among other things, the central report generator 110 executes application software for generating inspection reports 116. Together, the central report generator, data repository and the data collection devices comprise a system for inspecting item and generating inspection reports. Furthermore, the central report generator 110, data repository and the data collection device 106 are configured such that, among other things, software updates, renderable report templates 108, and data are downloaded to the data collection device 106.

The data collection device automatically executes a power-up sequence when turned on, which includes an authentication process. The unique User ID and password combination entered during the authentication process determine the user type that is logged on to the device. The system supports different user types defined by the function they serve to address diverse industry practices. Each user type is assigned permissions to access different areas of the system, and each individual user may have additional permissions or restrictions assigned to further control access and otherwise maintain security. User identification and authentication information along with authorized permissions are stored in a User profile.

In some embodiments, the inspection report 116 for a given item includes a compilation of multiple preliminary reports 113. For example, for a motorized vehicle, a first inspector might examine the body of the motorized vehicle, a second inspector might examine the power train (motor, transmission, differential, etc.), and a third inspector might inspect the electrical system, and each inspector would submit their own preliminary report 113 to the central report generator 110. Furthermore, in some embodiments, each of the inspectors would use a different renderable report template 108, which would include fields that are appropriate for the type of examination. For example, the renderable report template 108 for a passenger car would be different from the renderable report template 108 for a bulldozer. In other words, renderable report templates 108 can be specific to the item, eg., a Nissan Altima and a Volvo S-80 would have different renderable report templates associated with them, specific to a class of items, eg., a convertible motorized vehicle and a station wagon would have different renderable report templates associated with them, or specific to a category of item, eg., a passenger motorized vehicle and a bulldozer would have a different renderable report templates associated with them. In addition, renderable report templates can be different for the same item based upon who is the consignor (or seller). For example, the Nissan Altima can have different renderable report templates if it is being inspected or sold for BankOfAmerica versus Nissan Motor Credit Corporation.

In one embodiment, the central report generator 110 is in communication with a client-facility information management system 112. The client-facility information management system typically includes a computer system 114. The central report generator 110 communicates inspection reports 116 to the computer system 114 via a network 118 such as, but not limited to, the Internet. Non-limiting examples of methods by which the inspection report 116 can be electronic communicated to the computer system 114 include, but are not limited to, e-mailing and implementing file transfer protocol (FTP). In some embodiments, the computer system 114 accesses the central report generator 110 and retrieves the inspection report. For example, in one embodiment, the central report generator 110 includes a web server (not shown), which is normally a secure web server. A user of the computer system 114 logs into the secure web server and receives "web pages" that include one or more inspection reports 116. Thus, the inspection reports 116 can be made available for parties wishing to participate in an auction or sale of the related items. In some embodiments, the inspection reports, or portions of the reports can be made publicly available, or included along with other descriptive information on a site offering an item up for sale or for auction.

In some embodiments, the central report generator 110 is in communication with a database 120, which stores, among other things, item-history reports 122 for multiple items. Typically, item-history report 122 includes item specific information and item class information. For example, assuming the item is a motorized vehicle, item specific information includes, but is not limited to, the VIN, registration information, mileage information, maintenance information, insurance history, accident reports (if any), damage reports (if any), etc. Again assuming the item is a motorized vehicle, class information includes, but is not limited to, manufacturer (Ford, Nissan, Chevrolet, Lincoln, Volvo, etc.), model (Mustang™, Altima™, Trail Blazer™, Town Car™, S-80™, etc.), body-type (4 door, convertible, etc.), trim level (basic, luxury, sport, touring, etc.), engine type (gasoline, diesel, (4, 6, 8)-cylinder, turbo, size (displacement), accessories, etc.).

The central report generator 110 can access the database 120 and retrieve the item history reports 122. Typically, the central report generator 110 uses a unique identifier such as a VIN to locate an item history report 112 for a specific item. The central report generator 110 can use information contained in the item history report for a variety of purposes.

In one embodiment, the central report generator 110 can retrieve item-history reports 122 prior to an inspector 105 inspecting an item. The central report generator 110 can then use the information contained in the item-history report to pre-populate fields in the renderable report template 108. In this case, the inspector 105 can confirm the information contained in the pre-populated fields. Pre-population of fields can help prevent inspector errors. For example, one of the pre-populated fields might contain the unique identifier 104, which is frequently a long sequence of alpha-numeric characters, and it is easy for the inspector to accidentally make a mistake while reading the unique identifier 104 on the item 102 and inputting the alpha-numeric characters of the unique identifier 104 into the correct field of the renderable report template 108. In addition, pre-population helps prevent inspector oversight. For example, in the case of the item 102 being a motorized vehicle that was damaged in a flood, one of the fields in the renderable report template 108 would be pre-populated with the damage information so to alert the inspector to look for flood damage to the car.

In one embodiment, the central report generator 110 uses retrieved item-history reports 122 to confirm the accuracy of information in the preliminary report 113, thus providing a form of quality control. For example, assuming that the item 102 is a motorized vehicle and that the item-history report 122 for the motorized vehicle reflects that the motorized vehicle was, sometime in the past, in a front end collision, the central report generator 110 compares the item history report 122 with the preliminary report 113 to determine whether the inspector detected damage in the motorized vehicle's front end, which would indicate that the motorized vehicle had been in an accident, or whether the inspector detected signs of repair (body work, new paint, etc.), which would also be indicative of an accident. After comparing the preliminary report for a specific item with the item-history report 122 for that item, the central report generator 110 can determine whether to flag the preliminary report 113 or continue processing the preliminary report 113 into an inspection report 116 for the specific item. If the central report generator 110 flags the preliminary report 113, an inspector 105, which can be the same inspector who previously examined the item or a different inspector, is dispatched to re-inspect all or selected components of the item.

In one embodiment, the central report generator 110 is in communication with a computer system 124. The computer system 124 is operated by an entity that provides the items 102 to the inspection facility 100 or in some manner assists in the inspection of items 102. Non-limiting examples of entities that operate computer system 124 include an auction house, a leasor that had previously leased the items 102, and an agent of the owner of the items 102. The computer system 124 can receive inspection reports 116 from the central report generator 110.

The computer system 124 has inventory data 126 stored therein. The computer system 124 provides the inventory data 126 to the central report generator 110. Typically, the inventory data 126 includes a list of items that the entity is providing to the inspection facility 100 and the associated unique identifiers of the items. Thus, the central report generator 110 can use the unique identifiers carried in the inventory data 126 to retrieve item-history reports 122 from the database 120. In some embodiments, the inventory data 126 includes information that is typically included in item-history reports.

In one embodiment, initial inventory data is communicated by the seller or consignor electronically to the Inspection facility 100 in a format recognizable by the central report generator 110. Information from the initial inventory data is stored in the data repository 128. Examples of initial inventory information include an assigned lot number or other customer- or sale-specific identifier, applicable purchase restrictions such as state licensing requirements, or an industry-unique identifier such as the vehicle identification number (VIN). Before this data may be incorporated into the data repository 128, it must be converted into an appropriate format, by either a manual or automated process. Many External Systems, such as automated collections of asset-specific historical data or pricing and comparison tools, use the industry-unique identifier as the key, or primary means, of associating files and information. As an example in the automotive industry, the VIN is a descriptive identifier that contains coded information to identify a specific instance of an asset, including original configuration, manufacturer, as well as information specific to the manufacture of all subsystems, components, and parts. If the initial inventory data does not contain the industry-unique identifier it is obtained during the inspection process, converted into the necessary format, and added to the data repository. Reading and accurately recording the small font size and large number of alphanumeric characters contained in the VIN is the source of numerous human errors which, when erroneous information is sent in a request for data from an External System, will result in either no information being retrieved or erroneous information retrieved. Either outcome is unsatisfactory in the preparation of an inspection report and could lead to accusations of false representation. Information passed between an External System and the Inspection facility 100 is formatted according to known protocols such that the information is readable by the recipient.

In some situations, each industry or asset type uses a unique version of the application software for generating inspection reports, and each version of the application software typically has a unique set of data collection guides, or templates, to ensure consistent data collection across all assets. Customers in every industry have the choice to determine the template library used for inspecting their assets, and inspectors have the ability to create custom inspection templates on-the-fly to record inspection data, thus there may be any number of variations to the inspection templates.

Central Report Generator

Figure 2:
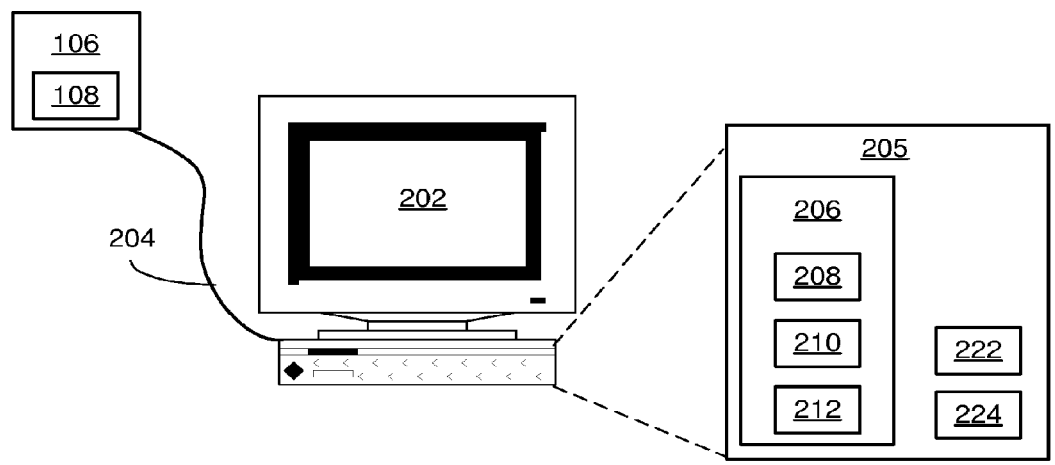
FIG. 2 is a diagram of a computer system employed by the inspection facility.

Referring to FIG. 2, in one embodiment, the central report generator 110 is embodied in a computer system 202. The computer system 202 is in communication with a data collection device 106 via an electrical connection 204. Typically, the computer system 202 is configured to hot sync with the data collection device 106. In some embodiments, the data collection device 106 and the computer system 202 communicate via a wireless interface (not shown). The computer system 202 and data collection device 106 communicate so that the data collection device 106 can provide the computer system 202 with preliminary reports 113, and, in some embodiments, to provide the data collection device 106 with selected renderable report templates 108.

The computer system 202 includes a memory 205 in which a report generator module 206 is stored. The report generator module 206 includes logic for, among other things, generating electronic inspection reportable templates 108 and generating inspection reports 116 using preliminary reports 113. The report generator 206 includes submodules such as a template generator module 208, a consistency checker module 210, and a report compiler module 212. The template generator module 208 generates renderable report templates 108. The template generator module 208 includes logic for creating different types of renderable report templates based upon criteria such as, but not limited to, the specific item to be inspected (e.g., Nissan Altima, Volvo S-80, etc.), or a classification of the item (e.g., convertible automobile, sedan automobile, coupe automobile, etc.), or a category of the item (e.g., passenger vehicle, tractor, bulldozer, backhoe, etc.), or classification of inspector (e.g., mechanic, electrician, etc.). In addition, different types of renderable report templates can be generated based upon a report recipient identifier, which identifies to whom the report is to be delivered. Furthermore, different types of renderable report templates can be generated based upon a report authorizer identifier, which identifies the entity that authorized the inspection of the item. Some entities might want a more through inspection than other entities that have similar items.

In some embodiments, the template generator module 208 includes logic for receiving item-information and using the item-information in the selection of the type of renderable report template to generate. In addition, the template generator module 208 can use the item-information to pre-populate fields in the renderable report template. Non-limiting examples of item-information include item-histories and VINs.

The consistency checker module 210 includes logic for, among other things, self-consistency checking of preliminary reports 113. The consistency checker module 210 reads entries in the fields of a preliminary report and confirms that the fields are self consistent. For example, assuming the item 102 is an automobile, an inspector might inadvertently populate a field that the automobile has evidence of a front-end collision and populate another field indicating that the paint of the automobile is the factory paint. In this example, the consistency checker module 210 would flag the preliminary report 113. In one embodiment, the consistency checker module 210 correlates information carried in the fields of the preliminary report to determine whether the information is self-consistent. For example, the consistency checker module 210 might correlate the information carried in a "Brake Pedal" field and a "Mileage" field. If the "Brake Pedal" field indicates the brake pedal pad has lots of wear and the "Mileage" field indicates that the mileage on the automobile is low, the consistency checker module 210 would flag the preliminary report because a worn brake pedal pad is indicative of lots of use, which implies high mileage. Another example would be a correlation between a "Key Ignition Switch" field and a "Mileage" field. The amount of scratches around the key ignition switch of an automobile is generally related to the amount of mileage on the automobile—a large number of scratches normally will imply high mileage. It should be noted that in some embodiments, the data collection device 106 includes a consistency checker module.

In some embodiments, the consistency checker module 210 includes the logic for comparing information carried in the fields of preliminary reports 113 with other (external) information, i.e., information that is outside of the preliminary reports. For example, the consistency checker module 210 can compare the information in a preliminary report 113 with information included in an item-history 122. If the consistency checker module 210 determines the information in the preliminary report 113 is not consistent with external information, then the consistency checker module 210 flags the preliminary report 113.

In some embodiments, when a preliminary report of an item 102 is flagged, the item 102 or selected components of the item are re-inspected. The consistency checker module 210 provides an alert when a preliminary report is flagged.

The report compiler module 212 receives preliminary reports 113 and compiles them into the inspection report 116. In some embodiments, the compiler module 212 uses preliminary reports 113 and item-history reports when compiling the inspection report 116. The report compiler module 212 can include the logic for providing the inspection report 116 to a computer system or other electronic device such as a Personal Digital Assistant, cell phone, printer, etc.

In yet another embodiment, the computer system 202 includes a database 222 of inspection reports and an analyzer module 224. The analyzer module 224 includes the logic for processing the inspection reports in the database 222 and determining correlations between fields in the inspection reports. For example, the information carried in the fields of the inspection reports are given numeric values, and the analyzer module includes statistical analysis modules. The statistical analysis modules are then applied to determine correlations between the fields. When correlations between two or more fields are found, the consistency checker module 210 is up-dated to check the consistency of those fields in light of their correlation.

Figure 3:
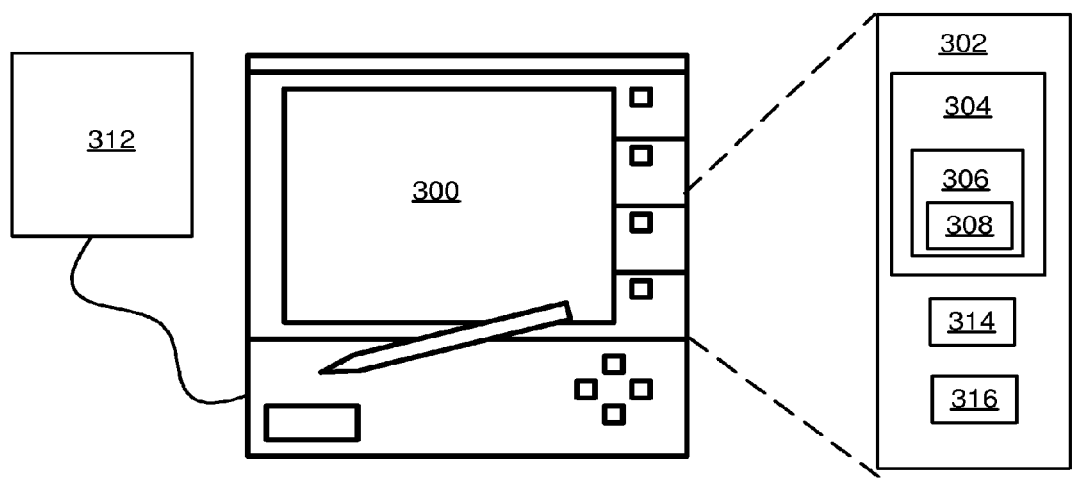
FIG. 3 is a diagram of an embodiment of a data collection device.

Data Collection Device:

FIG. 3 illustrates a personal digital assistant 300, which is intended as a non-limiting embodiment of a data collection device 106. Another non-limiting embodiment of a data collection device 106 includes a computer system such as a desktop or laptop computer. The PDA 300 includes a memory 302 that has an operating system 304 and inspection report software 306 stored therein. Among other things, the operating system 304 runs on the PDA 300 to provide functionality such as a resource management. The report software runs on top of the operating system 304. The report software 306 includes a rendering module 308, which renders renderable report templates 108 into electronic documents, i.e., into electronic inspection reports. The memory 302 also includes data 310. Typically, the data 310 can include inventory data for an item 102. In some embodiments, the memory 302 also includes a consistency checker module, which checks the consistency of information carried in fields of the renderable report template as the inspector inspects the item. The consistency checker module can prompt the inspector during an inspection about any inconsistency in the inputted data.

In one embodiment, an inspector can inspect an item and input information verbally. The inspector has an audio input/output device 312 that interfaces with the data collection device 106. The audio input/output device 312 employs noise-canceling microphones and ergonomic headsets that incorporate technology to optimize voice band response and reduce distortion. Such devices may connect directly to the data collection device 106 via interfaces capable of carrying either analog or digital audio information.

Context-sensitive scripts are played to the inspector through any full- or half-duplex, two-way audio I/O device that includes but is not limited to microphone, telephony, two-way radio, voice over Transmission Control Protocol/Internet Protocol (TCP/P), packet radio, satellite, and other such techniques. The I/O streams consist of a dynamically scripted dialogue based on renderable report templates. The inspector is prompted for information required to fill out the asset inspection and to navigate the application.

The memory 302 includes a voice recognition module 314 and an audio prompter module 316. The audio prompter 316 receives a renderable report template 108 and sends prompts or communications to the audio input/output device 312. The audio prompter 316 directs the inspector 105 to inspect various components of the item by reading the renderable report template 108. In some embodiments, the audio prompter 316 provides a tone or other audible prompt. In other embodiments, the audio prompter 316 provides a synthesized voice. For example, the audio prompter 316 might prompt the inspector 105 to inspect the paint of the item 102. The inspector 105 responds to the prompts from the computer system by inspecting the various components and uses the audio input/output device 312 to provide input information. For example, after inspecting the paint of the item, the inspector 105 might say into the audio input/output device 312 that the paint is "glossy with no scratches," or the inspector might simply speak a number which corresponds to a rating such as a "9"

out of "10." The voice recognition module 314 recognized the input information and populates the correct field in the renderable report template 108.

In some embodiments, the computer system 202 is in communication with a an audible input/output device 312. The computer system 202 and audio input/output device 312 communicate via a wireless communication link. Of course, the computer system 202 and audio input/output device 312 can be configured to communicate over a wire connection. The inspector receives prompts from the computer system 202 and provides input directly to the computer system 202. Consequently, fields in the renderable report template are filled in on the computer system 202 during the inspection.

It should be noted that in one embodiment, the inspector uses an integrated cell phone or another telephony-type device to access the computer system 202. The computer system supports an Interactive Voice Response Unit (IVR) interface or a Voice Response Unit (VRU) which responds to caller entered digits or speech recognition in much the same way that a conventional computer responds to keystrokes or clicks of a mouse. When the VRU is integrated with database computers, callers can interact with databases to check current information (e.g., account balances) and complete transactions (e.g. make transfers between accounts). The VRU interface enables the inspector to initiate and conduct an inspection session using voice commands spoken into a telephone or cellular telephone handset, or otherwise. The inspector is then guided by template questions through the inspection process, speaking the appropriate response when prompted. An alternative implementation of the telephone interface links the inspector in the field with a data entry person operating the data collection device 106 in a centralized or other location, or alternatively, the entry person can enter the data directly into the computer system 202.

Figure 4:
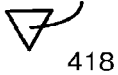
FIG. 4 is a diagram of a renderable inspection report template.

Report Template:

FIG. 4 illustrates selected portions of an exemplary renderable report template in rendered form, i.e., a report template 402 for a passenger vehicle. The report template 402 includes fields 404-416. Field 404 is for carrying the VIN of the inspected passenger vehicle, and fields 406-412 are for carrying the manufacture, model, year, and mileage, respectively. The inspector can use tabs 418 to populate the fields 406-410. Fields 414 and 416 are for carrying "Brake Pedal Pad" and "Key Ignition Switch" information, respectively. It should be remembered that the report template 402 is only a rendering of selected portions of an exemplary renderable report template and that other exemplary report templates would include more or fewer fields and/or different fields.

Figure 5:
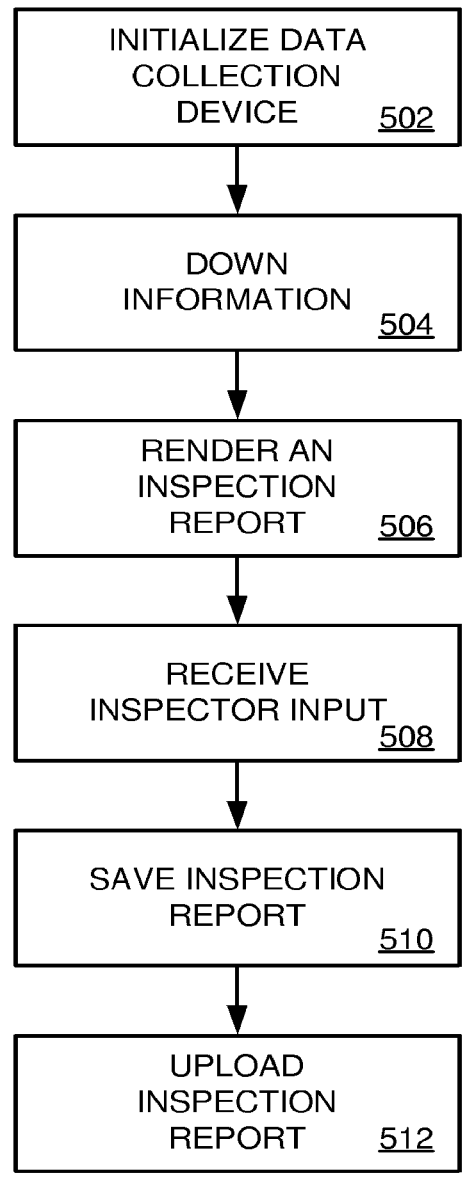
FIG. 5 is a flow chart of steps employed in inspecting an item.

Inspection of Item:

FIG. 5 is a flow chart of steps taken during the inspection of an item 102. The flow chart illustrated in FIG. 5 shows the architecture, functionality, and operation of a possible implementation of application specific software. In this regard, each block represents a module, segment, or portion of code, which comprises one or more executable instructions for implementing the specified logical function(s). It should also be noted that in some alternative implementations, the functions noted in the blocks may occur out of the order noted in FIG. 5. For example, two blocks shown in succession in any of the FIG. 5 may in fact be executed substantially concurrently or the blocks may sometimes be executed in the reverse order, depending upon the functionality involved, as will be further clarified hereinbelow.

Application specific software program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

In step 502, the data collection device 106 is initialized. Initialization can include logging into the data collection device to establish a user and establishing a communication link with the computer system 202.

Frequently, the computer system 202 receives user information so that the computer system can authenticate the user of the data collection device. When a user authenticates onto the computer system, the data collection device performs a communication session with the computer system and downloads:

(a) the current version of software for a Customer,
(b) the necessary template(s) for that Customer based on industry, preferences, and
(c) all inventory data available thus far from the Customer and external systems.

In step 504, the data collection device receives information from the computer system 202. Typically, the data collection device receives the information responsive to a request for data sent from the data collection device 106 to the computer system 202.

Among other things, the computer system 202 performs a check on a database version running on the data collection device 106, and subsequently sends and installs updates as appropriate. If there are no updates, or upon completion of the version check, a request for new Inspection Report data is processed.

The downloaded information also includes renderable report templates. In one embodiment, the computer system 202 selects the type of renderable report template to be downloaded. Criteria for selecting the type of renderable report template include the specific items to be inspected, a classification of the items, or a category of the items, or classification of user/inspector, or report recipient identifier, or a report authorizer identifier.

Frequently, multiple renderable report templates are downloaded, followed by new data sent on a per item or renderable report template basis. In the event of an error at any point during this process, the download is automatically retried the number of times specified in the setup. Downloaded inventory data displays in the associated data fields of the renderable report templates, thus initiating the set of renderable reports for this set of assets and eliminating the need for manual input by the inspector. The inspector can override or otherwise edit information populated into these fields if any corrections or additions are noted during the inspection. This flexibility is particularly important with respect to original configuration information because the asset may undergo changes such as a paint job, installation or removal of various accessory items, or accident damage.

In step 506, an inspection report for one of the items in the list of items to be inspected is rendered, thereby producing an electronic document having fields related to the item to be inspected.

In step 508, inspector input is received. The received inspector input is related to fields included in the renderable report template. The inspector provides input to some or all of the fields in the renderable report template. In some situations, the inspector might not need to provide input to some of the fields because those fields might have been pre-populated.

In step 510, the inspection report for the item that was being inspected is saved. In step 512, the saved inspection report is uploaded to the computer system 202. In some embodiments, the inspector will first inspect each of the items in the list of items to be inspected before uploading the inspection reports for the inspected items.

Figure 6:
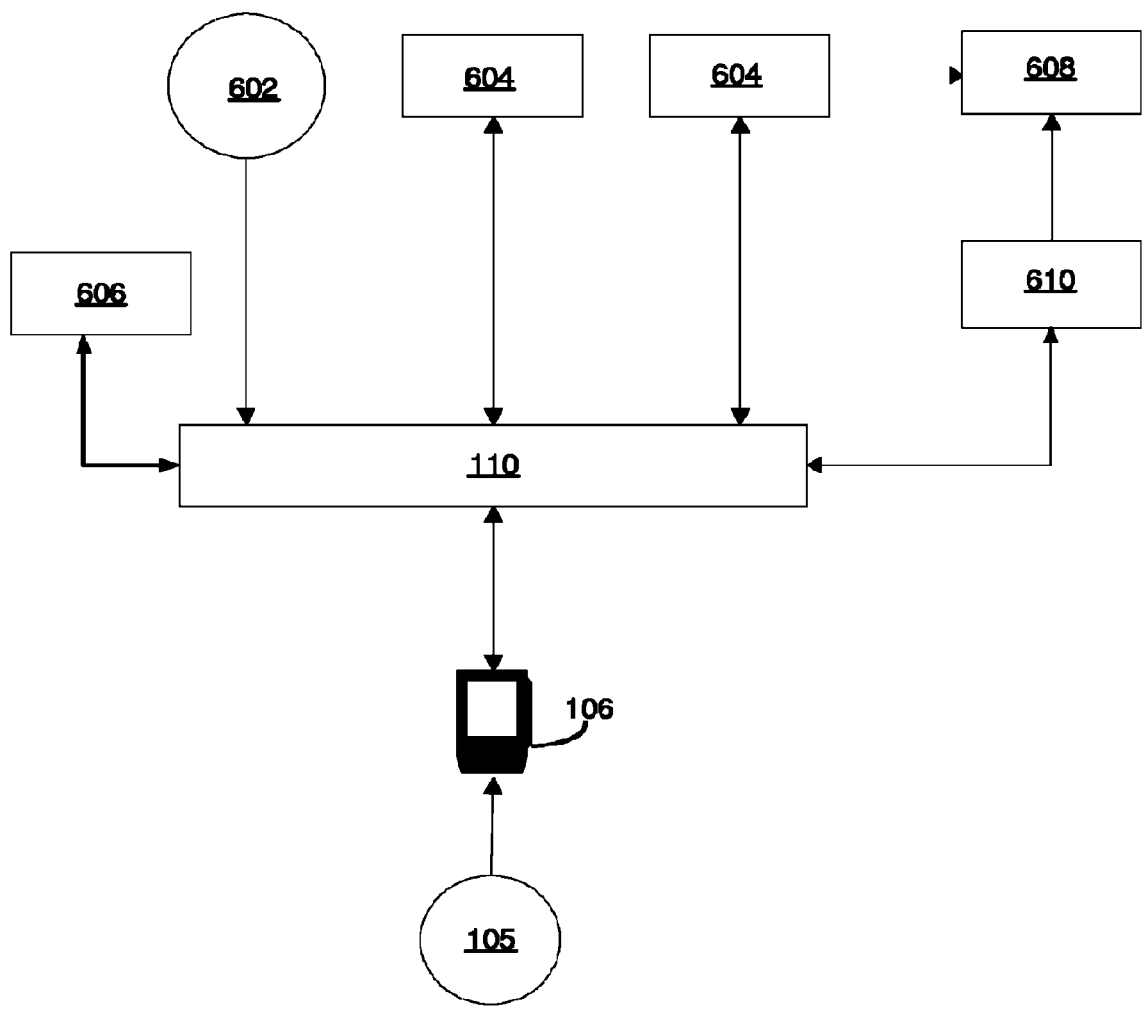
FIG. 6 is a diagram of an embodiment of the inspection process.

Sample Use Scenario:

FIG. 6 outlines the streamlined electronic inspection process supported by the current invention, highlighting the robust, full-duplex data flows between all system components which result in fast and accurate reporting, rich data mining opportunities, improved accuracy, and overhead cost savings. Labels used in all diagrams are for illustrative purposes only and not intended to describe or limit the nature of any component.

The data collection devices 106 may be one of many device types depending upon the desired implementation. Device types may include a personal or laptop computer, personal digital assistant (PDA), voice recognition system, or other portable or stationary computing device or platform. However, it will be appreciated that one aspect of the present invention is the ability to deploy the invention within a portable environment to enable inspectors to easily move around a site containing items to be inspected and to enter the data as the inspection is performed—electronically, without having to later transcribe the information onto another medium. The data collection device contains software necessary to support the electronic data collection process and transfer of data between the device and other servers, tools, or repositories. Methodologies used for direct collection of electronic data needed for eCommerce include but are not limited to those that require human input using a handheld device, laptop or personal computer and voice recognition and voice synthesis technology applications that convert the spoken input directly into electronic data. This data collection process links to external systems 604 using a compatible format determined by the central report generator 110, thus eliminating redundant data entry efforts.

Examples of hand-operated techniques include bar code scanning or otherwise inputting the information into a handheld device or entering the information into data entry fields on a laptop or personal computer. Voice-operated techniques of electronic data collection involve speaking the information in any one of a number of languages into a headset or other type of microphone device. Voice recognition and voice synthesis technologies capture the information directly in the electronic format required for eCommerce.

The central report generator 110, which is also known as Level-1 data repository, is the central computer system containing one or more databases. It is the primary interface to the data collection devices and may contain data pertaining to one or more unique Customers. A system 602 communicates electronic information to the central report generator. An Auction house is a non-limiting example of an entity running the system 602, and initial inventory data is a non-limiting example of the type of information that is electronically communicated to the central report generator 110. Initial inventory data conveyed using the electronic inspection process may or may not vary from that conveyed using the manual process, and any necessary data reformatting is automatically handled by the repository upon receipt. If the unique identifier for an item is known prior to the inspection of the item and is contained in the initial inventory data, a variety of asset-specific information may be obtained electronically from appropriate external systems 604 and merged with the initial inventory data prior to downloading information to the data collection device 106. If the initial inventory data does not contain the industry-unique identifier, the identifier is obtained during the inspection process and returned with other collected data to the central report generator (Level-1 data repository) 110.

The central report generator 110 runs software for implementing the electronic inspection process. Typically, the inspection facility services many industries, and each industry or asset type requires a unique version of the application software with a unique set of data collection guides, or templates, to ensure consistent data collection across all assets. Customers in every industry have the choice to determine the template library used for inspecting their assets, and inspectors have the ability to create custom inspection templates on-the-fly to record inspection data, thus there may be any number of variations to the inspection templates.

The data collection device includes software that controls User authentication, access to business-critical information at the data collection device, collection of asset condition information, capture of images, and data exchange with the central report generator 110 (Level-1 data repository). The data collection device receives and stores in a local handheld database all information required to use the data collection device in off-line mode during data exchange with the central report generator 110 (Level-1 data repository).

The data collection device automatically executes a power-up sequence when turned on, which includes an authentication process. The unique User ID and password combination entered during the authentication process determine the user type that is logged on to the device. The central report generator 110 supports different user types defined by the function they serve to address diverse industry practices. Each user type is assigned permissions to access different areas of the central report generator 110, and each individual user may have additional permissions or restrictions assigned to further control access and otherwise maintain security. User identification and authentication information along with authorized permissions are stored in a User profile.

The term "Super User" is one that represents the highest level of User privilege and allows access to system files and set-up or configuration files. The central report generator 110 enforces dual control over any User granted such status. An example of a Super User might be a system administrator 606 at an inspection facility responsible for maintenance and implementation of the central report generator 110 (Level-1 data repository), while another might be the system administrator 608 with different responsibilities for one or more other data repositories 610, eg., Level-2 data repositories. The system administrator 608 might receive information from external systems 604.

When a user authenticates onto the system, the data collection device performs a communication session through the connectivity device with the central report generator 110 (Level-1 data repository) and downloads:

(a) the current version of software for that Customer,
(b) the necessary template(s) for that Customer based on industry, preferences, and
(c) all inventory data available thus far from the Customer and external systems.

In some embodiments, some inspectors have direct access to the Level-1 data repository handling a specific Customer and some do not have direct access. The first scenario discussed is the user with direct access at the inspection facility.

The data collection device is taken to the inspection area and the user performs any number of inspections on inventory items and feeds information about the items into the templates. If inventory items not included on the list of assets to evaluate are encountered in the inspection area, the necessary template is available on the data collection device to initiate an inspection report for the new inventory item. Applications running on the device enable it to intelligently interrogate an inspector by asking only questions pertinent to the object. The user is guided through the inspection process by use of "smart" templates that are continuously refined through the application of data mining techniques on collected data central report generator 110 (Level-1 data repository) and/or at other data repositories.

If the inspector does not have direct access to the central report generator 110 (Level-1 data repository), as would be the case when the inspection occurs off-site, a computer (not shown) is used in conjunction with the data collection device and serves as a "connectivity manager" to activate the necessary remote communication session, which can be carried over a wired or wireless communication link. Typically, the computer runs a Windows operating system, but other operating systems are intended to be within the scope of the invention. One typical application for this scenario includes Customers with multiple local offices throughout the country that prefer a single central report generator 110 (Level-1 data repository) be located at a particular site, usually a corporate office or other headquarters.

At the conclusion of an inspection or at a desire point in time desired or as required, the inspector initiates a communication session with the central report generator 110 (Level-1 data repository) to upload collected data. Data uploaded from the data collection device to the central report generator 110 (Level-1 data repository) is immediately available for use by other users, processes, and functions via any standard computer that is able to connect to central report generator 110 (Level-1 data repository) with the appropriate credentials.

Other users may include but are not limited to inspection facilities, insurance companies, transportation company administrators, manufacturers, and other interested third parties. Of particular interest, the administrator of an inspection facility may benefit from reports that track the accuracy of inspectors, the number of modifications made to an inspection report, the amount of time required by any given inspector to perform an inspection on a particular asset type, and other such performance measurements. These metrics not only provide valuable feedback to human resources and evaluation processes, but also invaluable feedback regarding the accuracy of information provided to external decision makers. Thus, the present invention advantageously enables user to quantify the degree of accuracy of the inspection reports, and offer a level of trust or reassurance to consumers and potential consumers that the vendor's reports are accurate and reliable.

Data Repositories

The central report generator 110 (Level-1 data repository) is a set of independent modules or components, each of which can be hosted on a different device if necessary to address any unique customer, performance, or reliability issues. A set of directories on the file system contain the binaries, configuration files, and log files. The files include INI-style, standard format configuration file that include general settings determined during system installation and which are used by components except centralized storage. Read permissions for this file are typically restricted to the system administrator because it stores the main database user name and password. In event of system configuration changes, a system administrator normally changes the content of this file manually.

Figure 7:
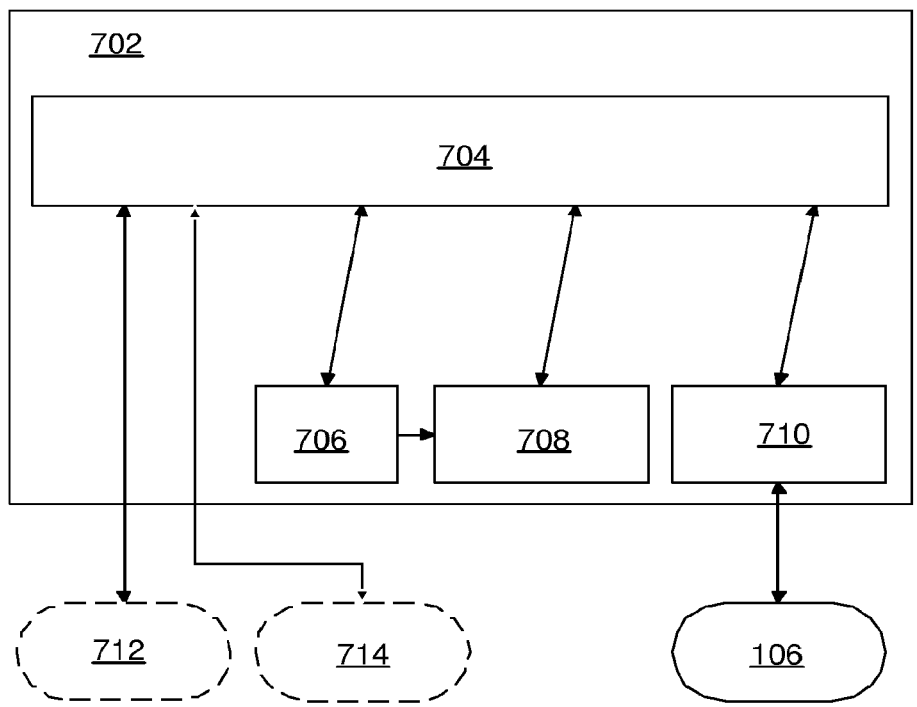
FIG. 7 is a diagram of an architecture of a data repository.

FIG. 7 illustrates an embodiment of the overall architecture of the central report generator 110 (Level-1 data repository), which manages inventory data based on a unique identifier defined for each customer, and is responsible for managing all inspection report activity for the current inventory. The central report generator 110 (Level-1 data repository) may exist as a stand-alone server or be tiered into an enterprise architecture consisting of one to many other data repositories, either of which may be located at an inspection facility or at a remote location. The central report generator 110 (Level-1 data repository) includes a server 702 having a central storage system 704, a schedule checker module 706, an import/export subsystem module 708, and a synchronization subsystem module 710. The central storage system 704 is in communication with an administrative module 712 and a web module 714. The synchronization subsystem module 710 is adapted to communicate with the data collection device 106, using TCP/IP or any other suitable communication protocol. It should be noted that it is not mandatory that all the components of the central report generator 110 reside on the same physical computer.

In one embodiment, the administrative module 712 is a separate off-line administrative tool making central report generator 110 (Level-1 data repository) management easier during initial setup phases or in the case of a hard system failure. It provides comprehensive facilities for configuration maintenance and server-side log files review. This administrative mechanism is based on a leading toolkit in the free software community and employs an easy-to-use GUI in a style standard for Linux GUI applications. The application program interfaces (API's) to third-party external systems are configured to facilitate direct linkage between the collected data and these other systems.

Generic data access libraries are used, therefore code on the server-side component of the web module component 714 of the central report generator 110 (Level-1 data repository) does not rely on the specific database server vendor. Open Data Base Connectivity (ODBC) database access protocol provides platform-independence and database vendor independence. A GUI utility provides a simple interface to the ODBC data sources configuration and may be used to set up the data source for the Level-1 data repository components.

In one embodiment, software running on the central report generator 110 (Level-1 data repository) provides an easy method to re-define templates used in the inspection process and to re-distribute those templates to the associated servers and data collection devices in any established hierarchy. The central report generator 110 (Level-1 data repository) controls the template modification process and sends updates to other data repositories for redistribution from any server in the hierarchy. An administrator uses a GUI to effect modifications such as change the sequence of steps in the inspection process, add steps to or delete steps from the process, or create a new template from existing template steps. Each data collection device receives updates pertaining to their industry or asset type during a subsequent communication session.

The central storage system 704 represents a standard database configured separately from the other components. A customer host system sends data to the central storage system 162, where it is stored until requested and downloaded by a data collection device. This incoming data can be in any number of formats. The central report generator 110 converts incoming data into a standard industry data schema that covers many or all possible configurations. In the event of an application or hardware failure, a notification mechanism alerts the specified administrator(s) to the failure using E-Mail, short message service (SMS), pager or other messaging device or service. A similar notification system alerts the specified person(s) in event of all other system-level failures. A descriptive message is stored in the log file for any failure to assist the administrator with troubleshooting and repair.

The Schedule Checker module 706 is a program executed on a regular basis by a Chron daemon, a standard service of the UNIX operating system. The Chron daemon maintains a list of actions established by an administrator and executes actions according to their associated schedule ("Chron job"). The system provides a standard set of Chron jobs, and an administrator may implement additional Chron jobs. An interface provides a separate task list for each system user. Schedule Checker communicates regularly with the database to check the task timetable. At the appointed time, the program associated with the task obtains all required parameters from Schedule Checker 706 and the database and performs the required data processing.

Information presented in the authentication request determines the set or sets of inspection report templates for the specific device and user connected. An application version parameter controls compatibility. The synchronization process automatically aborts if an incompatibility exists between the data collection device and central report generator 110 (Level-1 data repository) software. There are two types of synchronization performed by the central report generator 110 (Level-1 data repository): simple data upload from the data collection device to the Level-1 data repository or bidirectional (full) synchronization, which includes both data upload to and data download from the central report generator 110 (Level-1 data repository). The user selects the synchronization type from an Options Management Subsystem (not shown).

In one embodiment of the data collection device, the synchronization process begins with the user placing the data collection device in a cradle (not shown) or other connectivity device and initiating a communication session with the Level-1 data repository. The data collection device connects to the central report generator 110 (Level-1 data repository), performs authentication, and awaits a response before beginning the synchronization process. The central report generator 110 (Level-1 data repository) authenticates the user and various parameters, including but not limited to application version and screen size, and then responds to the data collection device. If authentication fails, the data collection device receives an error identifier and error message. The error message logs to a synchronization log and the synchronization process aborts. If authentication succeeds, the user is logged into the central report generator 110 (Level-1 data repository) and the synchronization process proceeds.

Figure 8:
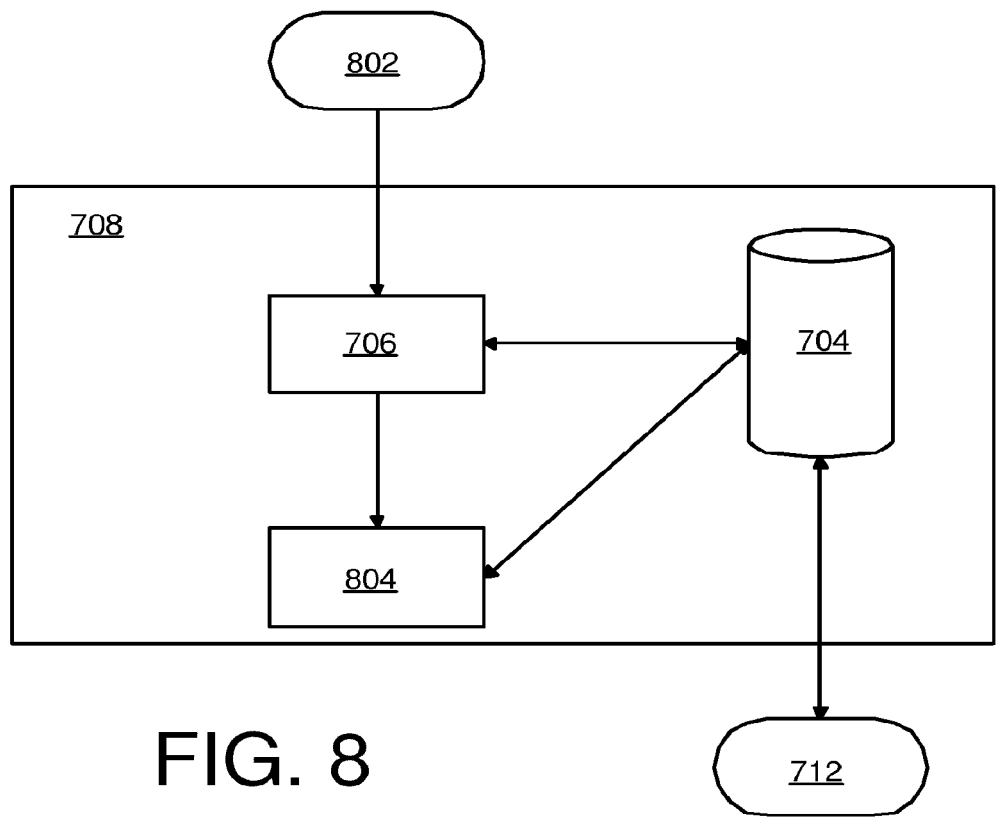
FIG. 8 is diagram of a component of the data repository.

FIG. 8 depicts the Import/Export subsystem 708, or electronic data interface (EDI) subsystem workflow. There is no direct access from an external system to the central storage system 704. The Chron daemon 802 periodically runs the Schedule Checker 706 to initiate data imports from and exports to external systems according to schedules and parameters stored in the central storage system 704. The schedule checker launches an Import/Export Engine module 804, which parameters and process data from the central storage system 704. An administrator controls and maintains Chron job schedules through the Administrative Module 712.

The Administrative Module 712 is the primary interface used by administrators and is comprised of a number of subsystems designed to oversee typical administrative functions, such as but not limited to database, users, logs, and inspection report management, authentication & authorizations, as well as the popup lists created from progressive feedback from data mining activities. The main screen of the application includes standard GUI elements, such as a main menu panel, speed access toolbar with a set of shortcut buttons, scrollable speed access toolbar, scrollable worktop, and a status bar. The stand-alone Administrative component is a standard three-level architecture, the main principle of which is the logical division of the application into three main levels, which are independent of the others and which are referenced herein as Levels A, B, and C. This architecture allows scalable and flexible solutions to service different industries.

Level A contains a GUI to facilitate interaction with the system, entering, editing and viewing data, among other functions. In most implementations, Level A will interact with Level B to receive, manipulate and send back data. There could be some cases when Level A will interact directly with Level C, bypassing Level B, for performance improvement and optimization. One such example is the population of lists with data.

Level B serves as an isolation level that encapsulates implementation of different business functions from the GUI. Level B contains implementation of business rules that manage data processing and serve as a middle tier between a User and database. The action, performed by the User on Level A, is projected to the number of different executions of actions on Level B.

Level C manages the data access process and provides different services for Level B. The isolation of the data access functionality provides the ability to change its location or accessing protocol in the database management subsystem without major influences on the other two levels of the application.

Each Customer is provided a specified license number and expiration date. This data is only accessible by an authorized administrator. The central report generator 110 requires all server and data collection device applications to check the license expiration date based on an internal clock, as opposed to a data/time set by an Administrator. Once expired, access is restricted to the central report generator 110. The authorized administrator can reset the expiration date or to remove all software from the associated servers. The central report generator 110 notifies data collection devices of the expiration during the next communication session.

In one embodiment, a system is comprised of tiered servers. The basic functions performed by any server are to receive data from a lower level server, to transmit data upward to the next higher-level server (if one exists), to provide system administrator functions, and to provide view-only access to the inventory data. Functions such as input/output (I/O), and processing software and template updates are typically common to all servers regardless the architecture. Level-2 data repository 802 provides data redundancy, Level-1 data repository 804 failover capability, common software update processes, and data rollup capability for authorized users. The user interface at the Level-1 and -2 data repositories is normally restricted to view-only access of the inventory data, although full administrative access to the data through a different interface is granted only to users at the highest permission level. Level-N data repository 806 is the highest level data repository.

Reporting is based on database queries and thus results are limited to the collection of data upon which the query is executed and further controlled by permissions granted the user. Intermediate levels act not only as data transfer tools but also as data roll-up levels based on the structure defined for each implementation. Multiple tiers may be associated with an individual implementation and the richness of reporting increases at each tier. For example, if Company ABC1 implements the system, reporting based on the data contained on their Level-1 data repository is uniquely representative of information from ABC1 assets and may be construed to include region-specific information. Corporation ABC1 may be comprised of one or many sites, and could be the Level-2, or second tier, data repository containing all data from all sites. Likewise, higher-level data repositories such as the Level-N data repository 806 could be the top tier. The application of statistical analyses and data mining techniques at the Level-N data repository 806 results in the discovery of industry—and asset—wide trends, regional profiles, and a broad range of other trends.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for facilitating the inspection of the present physical characteristics of an item by a plurality of human inspectors and the generation of an inspection report pertaining to subjective and/or objective data associated with the item, the system comprising:
    a means for providing a report template to a mobile device, the report template having a plurality of fields for carrying and/or receiving information from a human inspector, wherein the report template is customized based on the type of inspection to be performed and one or more of the plurality of fields is pre-populated with data associated with a unique identifier of an item to be inspected;
    at least one mobile device for receiving and rendering a report template for the benefit of a human inspector who is actively inspecting the present physical characteristics of an item, wherein the mobile device is operable to:
        populate a field of a report template based on an input of inspection data from a human inspector;
        generate a preliminary report from the populated report template; and
        transmit the preliminary report to a central report generator;
    a central report generator operable to receive a plurality of said preliminary reports and generate a master inspection report, wherein each of the plurality of preliminary reports contain inspection data associated with the same inspected item;
    a consistency checker that is operable to compare (1) related inspection data comprised within the plurality of preliminary reports and (2) additional third party related data associated with the same inspected item and optionally items substantially similar to the inspected item, wherein any related inspection data and any additional third party related data that are disparate are converted into a system standard compatible format determined by the central report generator, and wherein, if the compared data are contradictory, the consistency checker is operable to flag the related inspection information; and
    an analyzer configured to perform statistical analysis of the related inspection data and/or the additional third party related data such that the statistical analysis yields correlation values, the consistency checker further configured to utilize the correlation values in the comparison.

2. A program embodied in a non-transitory computer-readable medium of a mobile device for facilitating the physical inspection of an object by a plurality of human inspectors and the generation of reports resulting from the objective and/or subjective data collected during such inspections, the program comprising:
    a report template module adapted to generate a plurality of report templates, wherein each generated report template is customized to include a format and a plurality of fields based at least on the following information:
    an identifier of an object to be inspected; and
    an identifier of the type of inspection to be conducted on the object;
    a processor configured to render a report template to a human inspector and generate an inspection report, the generation of the inspection report comprising the steps of:
    pre-populating one or more of the plurality of fields in a report template with data associated with at least one of said identifiers;
    receive data entries from a human inspector that are representative of an inspected object's condition; and
    populate one or more of the plurality of fields in the report template with the received data entries; a consistency checker module adapted to:
    compare data that are carried in at least two populated fields of a given report template for consistency, wherein the populated fields are associated;
    compare inspection data that are carried in at least one populated field for consistency with (1) historical inspection data associated with the identifier of an inspected object and (2) additional third party related data associated with the same inspected item and optionally items substantially similar to the inspected item; and convert any historical inspection data and any additional third party related data that are disparate into a program standard compatible format, an inspector-query module operable to query an inspector regarding information carried in the populated fields, wherein querying the inspector is triggered by a determination of inconsistency by said consistency checker;
    and an analyzer module configured to perform statistical analysis of the inspection data, the historical inspection data and/or the additional third party related data such that the statistical analysis yields correlation values, the consistency checker further configured to utilize the correlation values in the comparison.

3. The report program of claim 2, further comprising:
- a voice-recognition module in communication with the processor, wherein the module is adapted to receive voice input and, based on the received voice input, cause the processor to populate at least one of the plurality of fields in a report template.

4. The report program of claim 3, wherein the voice-recognition module is adapted to select a specific field of the plurality of fields based upon the voice input.

5. The report program of claim 2, further including:
- an audible-prompt module adapted to prompt the inspector to inspect a given component of the item.

6. The report program of claim 5, wherein the audible-prompt module includes a voice-synthesizer.

7. The report program of claim 2, further comprising:
- a completed report repository having a plurality of completed reports stored therein, each completed report having a plurality of populated fields.

8. The report program of claim 2, wherein the consistency module is further adapted to:
- impose self-consistency by retrieving data from a database, the data being carried in a first populated field of a first report and comparing the retrieved-data with data carried in a second populated field of a second report, the first and second populated fields being indirectly related to each other but not the same, is inconsistent.

9. The report program of claim 8, wherein the consistency module is further adapted to provide an alert responsive to determining that the data carried in the second populated field is inconsistent with the retrieved data.

\* \* \* \* \*